United States Patent
Uwe

[11] Patent Number: 5,435,183
[45] Date of Patent: Jul. 25, 1995

[54] METHOD AND APPARATUS FOR DETERMINING THE NUMBER OF SUCCESSIVE BALANCING OPERATIONS PERFORMED PER BALANCING OPERATION WHICH RESULTS IN A MEASURED UNBALANCE WITHIN A PREDETERMINED TOLERANCE

[75] Inventor: Moench Uwe, Bensheim, Germany
[73] Assignee: Hofmann Werkstatt-Technik GmbH, Germany
[21] Appl. No.: 15,160
[22] Filed: Feb. 9, 1993
[30] Foreign Application Priority Data
Feb. 11, 1992 [DE] Germany .................. 42 03 927.4
[51] Int. Cl.⁶ ............................................. G01M 1/16
[52] U.S. Cl. .................................................. 73/462
[58] Field of Search ........................................ 73/462
[56] References Cited
U.S. PATENT DOCUMENTS
4,348,885 9/1982 Mueller ..................... 73/462 X
4,424,711 1/1984 Giers et al. ................... 73/462

FOREIGN PATENT DOCUMENTS
0418574 3/1991 European Pat. Off. .
3531131 3/1986 Germany .
3713525 10/1987 Germany .
3743302 6/1989 Germany .

OTHER PUBLICATIONS
Hermann Brunnengraber, Peter Drust, Measuring Methods For The Balancing Technique, Hofmann Info. 2.
Gunther Himmler, Statistik In Der Auswuchttechnik, Hofmann Info. 10.
EPO Search Report EP 93 10 0461.

Primary Examiner—Richard E. Chilcot, Jr.
Assistant Examiner—Joseph L. Felber
Attorney, Agent, or Firm—Cushman Darby & Cushman

[57] ABSTRACT

In a method and apparatus for determining the number of successive balancing operations in which each rotary member to be balanced may require a different number of measuring runs to balance the rotary member within a specified tolerance, only measuring runs in which the measured unbalance lies within the specified tolerance are counted, whereby the result of the counting operation constitutes the number of successive balancing operations.

9 Claims, 1 Drawing Sheet

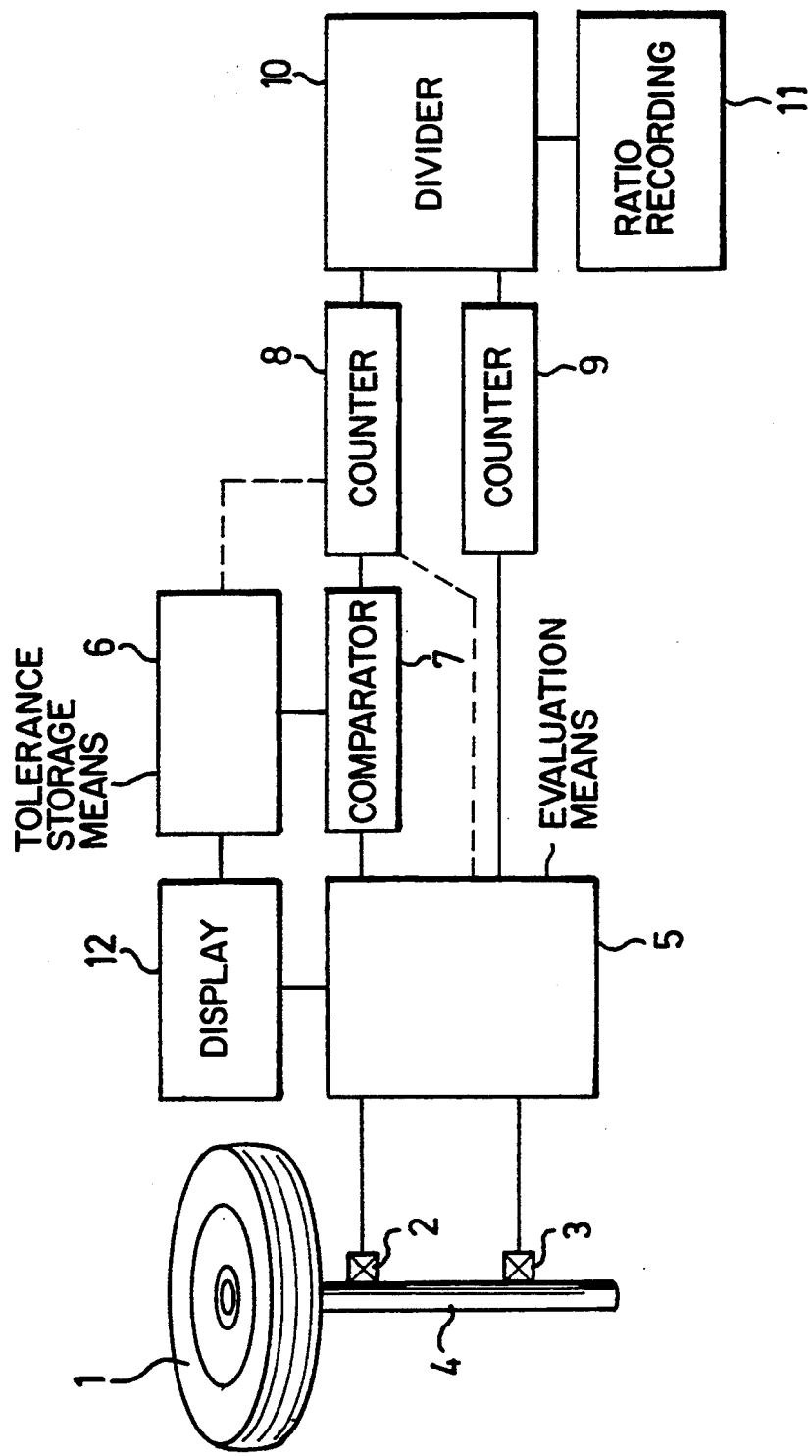

METHOD AND APPARATUS FOR DETERMINING THE NUMBER OF SUCCESSIVE BALANCING OPERATIONS PERFORMED PER BALANCING OPERATION WHICH RESULTS IN A MEASURED UNBALANCE WITHIN A PREDETERMINED TOLERANCE

BACKGROUND OF THE INVENTION

When balancing rotary members such as motor vehicle wheels on a balancing machine, each respective rotary member of a succession of such members often generally requires a different number of measuring runs in order to arrive at a balancing result in which the rotary member is balanced to such a degree that any residual unbalance that may possibly still be present lies within a specified tolerance, for example 3 g. However, the fact that each rotary member to be balanced, in a succession thereof, may involve a different number of measuring runs in order to arrive at the required degree of balancing accuracy gives rise to the difficulty that it is then not possible to count the number of rotary members which have actually been balanced on the balancing machine, on the basis of the number of measuring runs carried out.

There are various reasons for each balancing operation requiring a different number of measuring runs. For example, a rotary member to be balanced may involve a relatively large amount of unbalance in its initial condition, that is to say prior to its being balanced, and that makes it necessary to perform a larger number of measuring runs in order to bring the unbalance of the rotary member into the specified tolerance range. In addition, different levels of operator skill and different degrees of accuracy with which the respective balancing operations are carried out by different balancing operators can result in different numbers of measuring runs in successive balancing operations.

SUMMARY OF THE INVENTION

An object of the present invention is to provide a method of accurately determining the number of rotary members actually balanced on a balancing machine in successive balancing operations.

Another object of the present invent ion is to provide an apparatus adapted to accurately ascertain the number of rotary members actually balanced in a succession of balancing operations.

Still another object of the present invention is to provide a method of determining the number of rotary members actually balanced in a succession of balancing operations whereby the effectiveness of the balancing procedure on the equipment used can be accurately ascertained.

In accordance with the principles of the present invention, in a first aspect, the foregoing and other objects are achieved by a method of determining the number of successive balancing operations in which different numbers of measuring runs are carried out on a balancing machine for balancing each respective rotary member of a succession thereof, within a specified tolerance range. Of the plurality of measuring runs effected during a balancing operation for a respective rotary member, that measuring run at which the measured unbalance is within the specified tolerance range is used for a respective counting step in a continuous counting procedure.

In a further aspect in accordance with the invention the foregoing and other objects are achieved by a balancing apparatus for carrying out successive balancing operations on rotary members to achieve levels of unbalance which lie within a specified tolerance range, comprising an unbalance measuring means having measurement value detectors or sensors connected to an evaluation means, for ascertaining the unbalance of a rotary member, a tolerance storage means for the unbalance tolerance or tolerances, and a comparison means which is connected to the tolerance storage means and the evaluation means and adapted to ascertain whether the unbalance value which is measured in a rotary member measuring run is or is not within the tolerance range. The apparatus further comprises a counting means connected to the tolerance storage means and the evaluation means either directly or through a comparator, and adapted to be activated for a counting step in response to a measuring run giving a measurement value which is within the tolerance range.

As will be seen in greater detail hereinafter, the principles of the present invention provide that, during a respective balancing operation for balancing a rotary member, in which the rotary member is balanced in such a way as to lie within a specified tolerance range, out of the measuring runs which are required to bring the rotary member into the specified tolerance range that measuring run is selected in which it is found that the measured unbalance lies within the specified tolerance range. That measuring run can be referred to as the zero run insofar as in that run the rotary member is detected as lying within the tolerance range and no further measuring run is therefore required in respect of that rotary member. That zero run causes a counting step to be performed, in respect of a continuous counting procedure relating to the balancing equipment used. That counting procedure thus provides for accurately determining the number of rotary members, for example motor vehicle wheels, which have actually been balanced on the balancing equipment used, insofar as the counting procedure only takes account of the zero runs which correspond to successful balancing of a respective rotary member.

It will be appreciated that the fact that the number of rotary members actually balanced on a balancing machine can be accurately ascertained in that way is advantageous in regard to monitoring and checking operation of the balancing apparatus. For example, it is possible in that way to ascertain the relationship between the total number of measuring runs carried out, in a succession of balancing procedures, and the number of zero runs. It will be noted that, to achieve that aim, all measuring runs can be counted, in addition to the zero runs. The relationship between the total number of measuring runs and the zero runs thus provides information about the functionality and proper operation of the balancing apparatus, insofar as, if that relationship (number of measuring runs/number of zero runs) exceeds a given value, that may be an indication that the apparatus requires re-adjustment. It will be appreciated that a reference signal indicating the need for adjustment can also be produced after a predetermined number of measuring runs which can be ascertained by means of an additional counting operation.

Further objects, features and advantages of the present invention will be apparent from the following description of a preferred embodiment.

BRIEF DESCRIPTION OF THE DRAWING

The single FIGURE of the accompanying drawing shows a block circuit diagram of a balancing apparatus according to the present invention.

DESCRIPTION OF THE PREFERRED EMBODIMENT

Looking at the drawing, shown therein are only the components and features of a balancing machine, that are required for proper understanding of the present invention.

Reference numeral 1 in the drawing indicates a rotary member such as a motor vehicle wheel which is to be balanced in the balancing machine and which is clamped in position on a measuring spindle 4 by way of known clamping means (not shown). Reference numerals 2 and 3 identify measurement value sensors or transducers which co-operate with the measuring spindle 4 to measure forces caused by unbalance of the rotary member 1. The signals from the sensors 2 and 3 are passed to an evaluation means 5 which forms part of the unbalance measuring arrangement of the machine. Such unbalance measuring means and evaluation means are known and will therefore not be described in greater detail herein (see for example Hofmann Info 2 'Messverfahren in der Auswuchttechnik' [Measuring methods in the balancing art] from Gebr Hofmann GmbH & Co KG, Pfungstadt, Impr 96 200 220 010 199 05.88).

Connected to the evaluation means 5 is a display 12 for displaying the measured unbalance values.

The evaluation means 5 is also connected to a checking or monitoring means such as for example a comparator 7. Also connected to the comparator 7 is a tolerance storage means 6 for storing tolerance ranges in respect of unbalance values which are small enough to be acceptable, in respect of rotary members to be balanced on the balancing machine. It will be noted at this point that, if in a balancing procedure which has already involved carrying out one or more measuring runs on a rotary member to be balanced, with a balancing step also having been performed after each measuring run, it is then found in a further measuring run that the unbalance of the rotary member has been entirely eliminated or has been eliminated to such an extent that the unbalance is within the stored tolerance range by virtue of the balancing steps which were carried out on the rotary member after the previous measuring runs, that fact can be indicated by the display 12. It will be seen that the tolerance storage means 6 can also be connected to the display 12.

As indicated above, the measuring run in which it is found that the unbalance of the respective rotary member lies within the stored tolerance range can be referred to as a zero run, indicating that the target unbalance has been reached and no further measuring run will be required on that respective rotary member.

Referring still to the drawing, shown therein is a counter 8 which is connected to the comparator 7. The method of the present invention provides that the zero run in which it is found that the unbalance of the rotary member being measured now lies within the tolerance range stored in the tolerance storage means 6 is also used to the effect of activating the counter 8, for example by means of a counting pulse which is produced in that situation, to cause it to perform a counting step in a continuous counting procedure. In that respect the counter 8 may be connected to the evaluation means 5 by way of the comparator 7, as can be seen from the drawing. That configuration provides that the counter can count only the balancing operations which normally have a different number of measuring runs, and thus the number of rotary members actually balanced on the balancing machine, in a succession of balancing operations.

The illustrated embodiment of the balancing machine also includes a further counter 9 which is connected to the evaluation means 5. It will however be noted at this point that the counter 9 may also be connected to another component of the measuring arrangement comprising the sensors 2 and 3, the measuring spindle 4 and the evaluation means 5. The counter 9 is operable to count each measuring run which is carried out by the balancing machine.

The two counters 8 and 9 are connected to a divider 10 for forming the ratio between the total number of measuring runs performed on the balancing machine, which is counted by the counter 9, and the number of balancing operations or zero runs, corresponding therefore to the number of rotary members actually balanced, which is counted in the counter 8. That ratio provides information about the proper functionality of operation of the balancing machine. That ratio can possibly be used to provide an indication that fresh adjustment of the balancing machine is required, in particular if it is already ascertained at an early time that the ratio between the measuring runs to be performed and the counted number of balancing operations is relatively high, for which it is possible to set a given threshold value. A signal can thus be produced whenever that ratio exceeds a predetermined value or is below a predetermined value. On the other hand, it is possible to carry out the adjustment procedure on the balancing machine after a given number of measuring runs performed on the machine, as counted by the counter 9, in which case a signal can also be produced after a previously established number of measuring runs has been performed.

The ratio which is ascertained in the divider 10 can be for example continuously recorded and kept available in succession in respect of time by virtue of the provision of a recording device 11 such as a picture screen, printer, memory or the like. In that way it is possible to keep a record of the variation in respect of time of that ratio.

It will be appreciated that the above-described embodiment of a balancing machine according to the invention and the method according to the invention have been set forth solely by way of example and illustration of the present invention and that various modifications and alterations may be made therein without thereby departing from the spirit and scope of the invention.

What is claimed is:

1. A method of determining the number of successive balancing operations which involve balancing respective rotary members within a specified tolerance by carrying out different numbers of measuring runs on each rotary member on a balancing machine, wherein out of a plurality of measuring runs carried out during a respective balancing operation on a rotary member the measuring run in which the measured unbalance of the rotary member is within said tolerance is used for a respective counting step in a continuous counting procedure.

2. A method as set forth in claim 1 further including the steps of counting all measuring runs and forming continuously the ratio between the number of all measuring runs and the number of counting steps in the succession of rotary member balancing operations.

3. A method as set forth in claim 2 wherein the variation of said ratio is detected over a period of time.

4. A method as set forth in claim 2 wherein a signal is produced when said ratio varies beyond a predetermined value.

5. A method as set forth in claim 1 wherein a signal is produced after a predetermined number of measuring runs is performed.

6. Apparatus for carrying out successive balancing operations on rotary members for producing unbalances which lie within a specified tolerance comprising an unbalance measuring means having measurement value sensors for ascertaining rotary member unbalance, evaluation means connected to the sensors, a tolerance storage means for storing the unbalance tolerance, a comparison means connected to the tolerance storage means and the evaluation means for determining whether the unbalance value measured in a measuring run on a rotary member is within the tolerance, and a first counting means operatively connected to said tolerance storage means and said evaluation means by way of said comparison means, said first counting means being activated for a counting step at a measuring run with a measurement value within the tolerance.

7. Apparatus as set forth in claim 6 including a second counting means operatively connected to said unbalance measuring means and adapted to be activated to perform a counting step by each measuring run, and a divider connected to outputs of said first and second counting means.

8. Apparatus as set forth in claim 7 and further including a recording means connected to the divider for recording a variation of the ratio formed between the counting by said first and second counting means over a period of time.

9. In a procedure for balancing a plurality of rotary members in succession by effecting, for each rotary member to be balanced, a first measuring run for ascertaining if the unbalance thereof is outside a tolerance range, if necessary effecting balancing of said rotary member and effecting a second measuring run to ascertain if the unbalance of said rotary member is still outside said tolerance range, and if necessary repeating the balancing and measuring run operations until the measured unbalance is within said tolerance range, a method of determining the number of rotary members actually balanced in the performance of said balancing procedure, said method comprising counting in a continuous counting procedure out of the total number of measuring runs effected only those measuring runs in which the measured unbalance is within said tolerance range.

* * * * *

UNITED STATES PATENT AND TRADEMARK OFFICE
CERTIFICATE OF CORRECTION

PATENT NO. : 5,435,183

DATED : July 25, 1995

INVENTOR(S) : Uwe MOENCH

It is certified that error appears in the above-identified patent and that said Letters Patent is hereby corrected as shown below:

On the title page, item [75], should read

-- Uwe Moench --

Signed and Sealed this

Nineteenth Day of September, 1995

Attest:

BRUCE LEHMAN

*Attesting Officer*  *Commissioner of Patents and Trademarks*